(12) United States Patent
Wang et al.

(10) Patent No.: US 11,400,835 B2
(45) Date of Patent: Aug. 2, 2022

(54) POWER SLIDE

(71) Applicant: KEIPER SEATING MECHANISMS CO., LTD., Shanghai (CN)

(72) Inventors: Chuan Wang, Shanghai (CN); Hongbin Ni, Shanghai (CN); Zhenyi Tang, Shanghai (CN); Hongyu Wang, Shanghai (CN); Jiajing Yu, Shanghai (CN)

(73) Assignee: KEIPER SEATING MECHANISMS CO., LTD., Shanghai (CN)

( * ) Notice: Subject to any disclaimer, the term of this patent is extended or adjusted under 35 U.S.C. 154(b) by 0 days.

(21) Appl. No.: 17/271,605

(22) PCT Filed: Aug. 19, 2019

(86) PCT No.: PCT/CN2019/101329
§ 371 (c)(1),
(2) Date: Feb. 26, 2021

(87) PCT Pub. No.: WO2020/042946
PCT Pub. Date: Mar. 5, 2020

(65) Prior Publication Data
US 2021/0188133 A1 Jun. 24, 2021

(30) Foreign Application Priority Data
Aug. 28, 2018 (CN) .......................... 201810986126.9

(51) Int. Cl.
*B60N 2/07* (2006.01)
*B60N 2/02* (2006.01)
(Continued)

(52) U.S. Cl.
CPC ......... *B60N 2/0722* (2013.01); *B60N 2/0232* (2013.01); *B60N 2/067* (2013.01); *B60N 2/0818* (2013.01); *B60N 2002/024* (2013.01)

(58) Field of Classification Search
CPC .... B60N 2/0722; B60N 2/0232; B60N 2/067; B60N 2/07; B60N 2/0818; B60N 2002/024; B60N 2002/0236
(Continued)

(56) References Cited

U.S. PATENT DOCUMENTS 4,799,734 A * 1/1989 Periou ....................... F16B 1/00
297/362.14
9,789,965 B2 * 10/2017 Benthien ................ B60N 2/067
(Continued)

FOREIGN PATENT DOCUMENTS

| CN | 103580370 | 2/2014 |
| CN | 103818273 | 5/2014 |

OTHER PUBLICATIONS

"International Search Report (Form PCT/ISA/210) of PCT/CN2019/101329," dated Oct. 29, 2019, with English translation thereof, pp. 1-4.

*Primary Examiner* — Nkeisha Smith
(74) *Attorney, Agent, or Firm* — JCIP Global Inc.

(57) ABSTRACT

A power slide includes a left slide and a right slide, each including a top rail, a bottom rail, a lead screw and an electric motor. The top rail is arranged above the bottom rail and is slidably connected to the bottom rail, and a notch is formed in a middle portion of the top rail. The lead screw is arranged above the bottom rail in parallel and has two ends fixedly connected to the bottom rail. The electric motor includes a housing, a rotor shaft and a stator shaft. The housing is mounted in the notch, the stator shaft is fixedly connected into the housing, the rotor shaft penetrates into the stator shaft and is rotatably connected to the stator shaft, and an interior of the rotor shaft is threadedly connected to the lead screw.

12 Claims, 6 Drawing Sheets

(51) Int. Cl.
*B60N 2/06* (2006.01)
*B60N 2/08* (2006.01)

(58) Field of Classification Search
USPC .......................................... 248/424, 425, 429
See application file for complete search history.

(56) References Cited

U.S. PATENT DOCUMENTS

| | | | |
|---|---|---|---|
| 10,369,901 B2* | 8/2019 | Murakami | B60N 2/0705 |
| 2018/0334056 A1* | 11/2018 | Nagatani | B60N 2/1615 |
| 2018/0334058 A1* | 11/2018 | Nagatani | B60N 2/0705 |
| 2020/0108737 A1* | 4/2020 | Runde | B60N 2/0707 |
| 2021/0053467 A1* | 2/2021 | Aktas | B60N 2/43 |
| 2021/0053468 A1* | 2/2021 | Aktas | B60N 2/067 |
| 2021/0129709 A1* | 5/2021 | Lee | F16H 25/20 |
| 2021/0188133 A1* | 6/2021 | Wang | B60N 2/0722 |

* cited by examiner

POWER SLIDE

CROSS-REFERENCE TO RELATED APPLICATION

This application is a 371 of international application of PCT application serial no. PCT/CN2019/101329, filed on Aug. 19, 2019, which claims the priority benefit of China application no. 201810986126.9, filed on Aug. 28, 2018. The entirety of each of the above mentioned patent applications is hereby incorporated by reference herein and made a part of this specification.

BACKGROUND

Technical Field

The invention relates to the technical field of vehicle seat slides, in particular to a power slide.

Description of Related Art

As shown in FIG. 1 and FIG. 2, there are two types of power slides on the present market, namely front power slides and middle power slides.

Both the front power slides and the middle power slides are composed of a motor (1a), a motor bracket (2a), a flexible shaft assembly (3a), a left slide (4a) and a right slide (5a). The existing power slides have the following defects, neither the front power slides nor the middle power slides can meet requirements in future more complicated electric car body environments (due to the interference between the motor bracket and the car body or car components). The length of the motor bracket (2a) has to be designed to match different car bodies, and the modular capacity and the universality are poor. The motor bracket (2a) may be touched by passengers or drivers, so that the stability is poor. The motor (1a) transmits power to a lead screw by means of the flexible shaft assembly (3a) and a gearbox based on multi-stage transmission, so the number of parts is large, the sound quality and stability are poor, and the energy transmission efficiency is low.

SUMMARY

The main objective of the invention is to solve the technical problems of the prior art by providing a power slide that can adapt to more complicated electric car body environments and has good universality and stability.

The technical solution adopted by the invention to solve the aforesaid technical problems is as follows.

The invention provides a power slide, including a left slide and a right slide. The left slide and the right slide each comprise a top rail, a bottom rail, a lead screw and an electric motor. The top rail is arranged above the bottom rail and is slidably connected to the bottom rail, and a notch is formed in a middle portion of the top rail. The lead screw is arranged above the bottom rail in parallel and has two ends fixedly connected to the bottom rail. The electric motor includes a housing, a rotor shaft and a stator shaft. The housing is mounted in the notch, the stator shaft is fixedly connected into the housing, the rotor shaft penetrates into the stator shaft and is rotatably connected to the stator shaft, and the interior of the rotor shaft is threadedly connected to the lead screw.

Furthermore, the rotor shaft includes a rotor shaft body and an internal threaded shaft. An outer surface of the internal threaded shaft is fixedly connected to the rotor shaft body, and the interior of the internal threaded shaft is threadedly connected to the lead screw.

Furthermore, the rotor shaft body and the internal threaded shaft are fixedly connected by a key or in an interference manner.

Furthermore, the power slide further includes a front bracket and a rear bracket. The front bracket and the rear bracket are fixed to the bottom rail in a spaced manner, and two ends of the lead screw are connected to the front bracket and the rear bracket, respectively.

Furthermore, the power slide further comprises bearings and end covers. Inner rings of the bearings are respectively disposed around two ends of the internal threaded shaft, and outer rings of the bearings are respectively connected to the stator shaft through the end covers.

Furthermore, clamping blocks are respectively arranged on outer end surfaces of the end covers, clamping grooves are formed in the notch, and the clamping blocks are respectively matched with the clamping grooves.

Furthermore, a first rubber part is arranged between each of the clamping blocks and a respective one of the clamping grooves, and the first rubbers match the clamping blocks in shape.

Furthermore, the end covers are mounted in the notch by connecting brackets, and the connecting brackets are welded and connected to the top rail.

Furthermore, a second rubber part is arranged between each of the end covers and a respective one of the connecting brackets.

Furthermore, the power slide further comprises a power motor bracket having a U shape. Two vertical portions are arranged on two sides of the motor bracket, a hole is formed in each of the vertical portions, two end sections respectively extending towards two sides are arranged at a top end of the motor bracket and are parallel to the top rail, lower surfaces of the end sections are welded and fixed to a top surface of the top rail, and the power motor is mounted in a concave portion of the U-shaped motor bracket.

Furthermore, third rubber parts are respectively arranged between the electric motor and two sides of the electric motor bracket.

Furthermore, a threaded part is arranged in the rotor shaft and is engaged with the lead screw.

The invention has the following beneficial effects. When the position of the Power Slide needs to be adjusted, the rotor shaft of the electric motor is matched with the lead screw in a threaded manner, and the lead screw is fixedly connected to the bottom rail. In this way, the rotational motion of the rotor shaft can be converted into the relative linear motion of the top rail and the bottom rail, so that an adjustment of the relative positions of the top rail and the bottom rail is realized. Moreover, through the internal electric motor, parts such as a motor bracket and a flexible shaft are omitted, and the number of parts is reduced, so the power slide can adapt to more complicated electric car body environments and has increased universality and stability.

BRIEF DESCRIPTION OF THE DRAWINGS

To more clearly explain the technical solutions of the embodiments of the invention or the prior art, drawings used for describing the embodiments of the invention or the prior art will be briefly introduced below. Obviously, the drawings in the following description are merely for illustrating some embodiments of the invention, and those ordinarily skilled in the art can obtain other drawings according to the following ones without creative labor.

DESCRIPTION OF THE EMBODIMENTS

To allow those skilled in the art to have a better understanding of the advantages and features of the invention, the preferred embodiments of the invention will be expounded in detail below in conjunction with the accompanying drawings, such that the protection scope of the invention will be defined more clearly.

Figure 1:
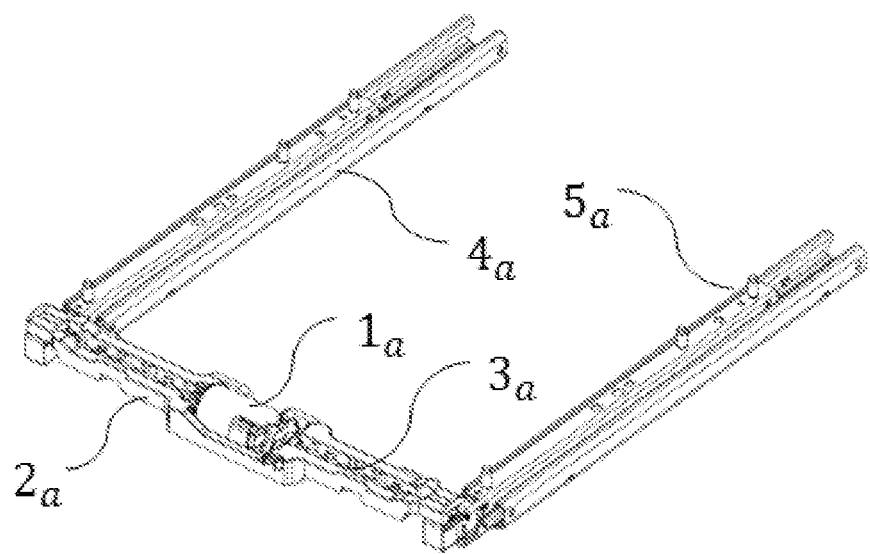
FIG. 1 is a structural diagram of a front power slide in the prior art.
Figure 2:
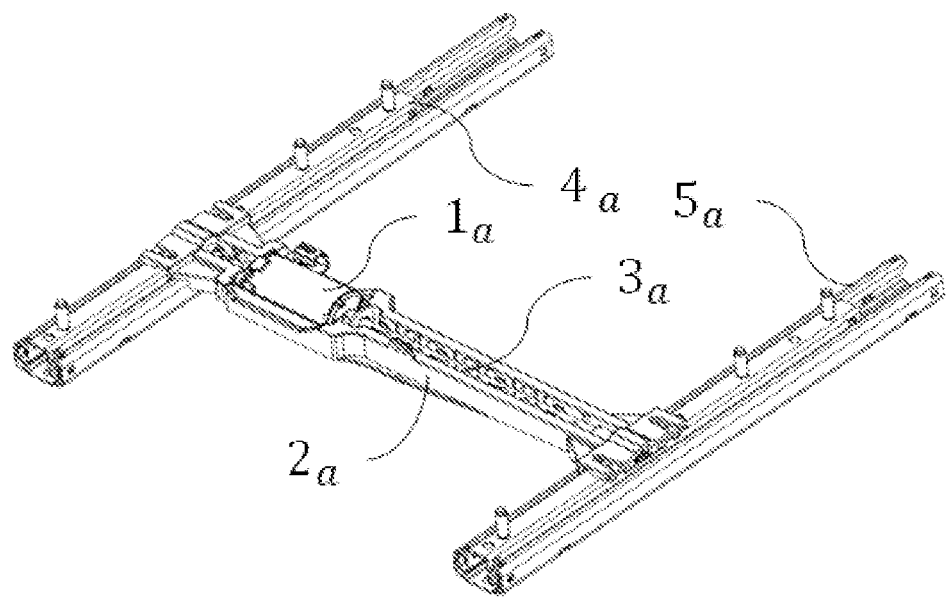
FIG. 2 is a structural diagram of a middle power Slide in the prior art.
Figure 3:
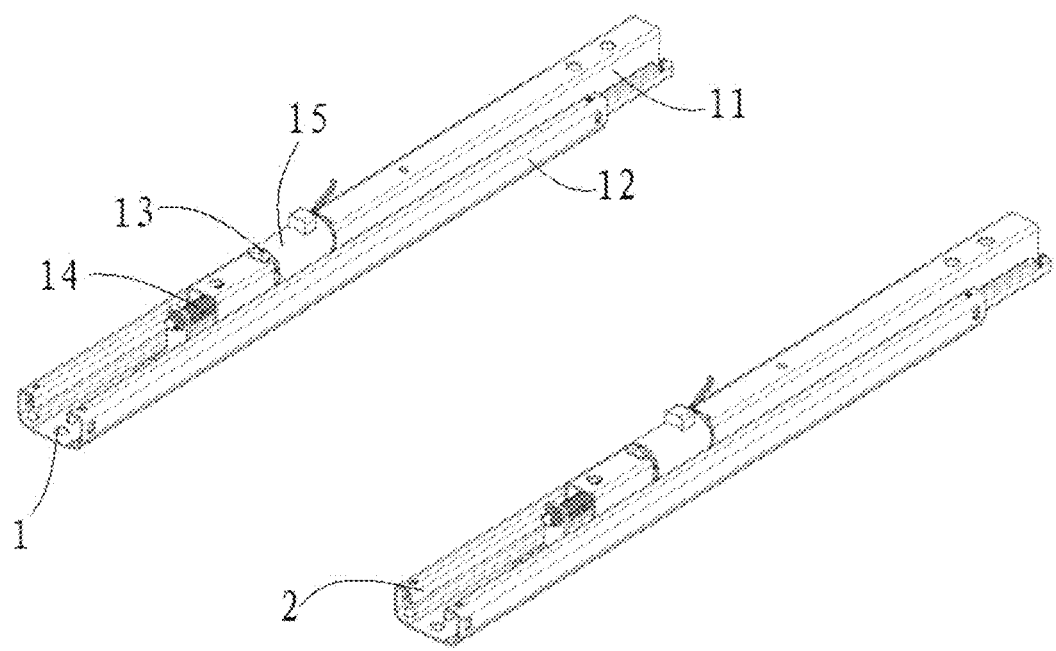
FIG. 3 is a structural diagram of a power slide according to the invention.
Figure 4:
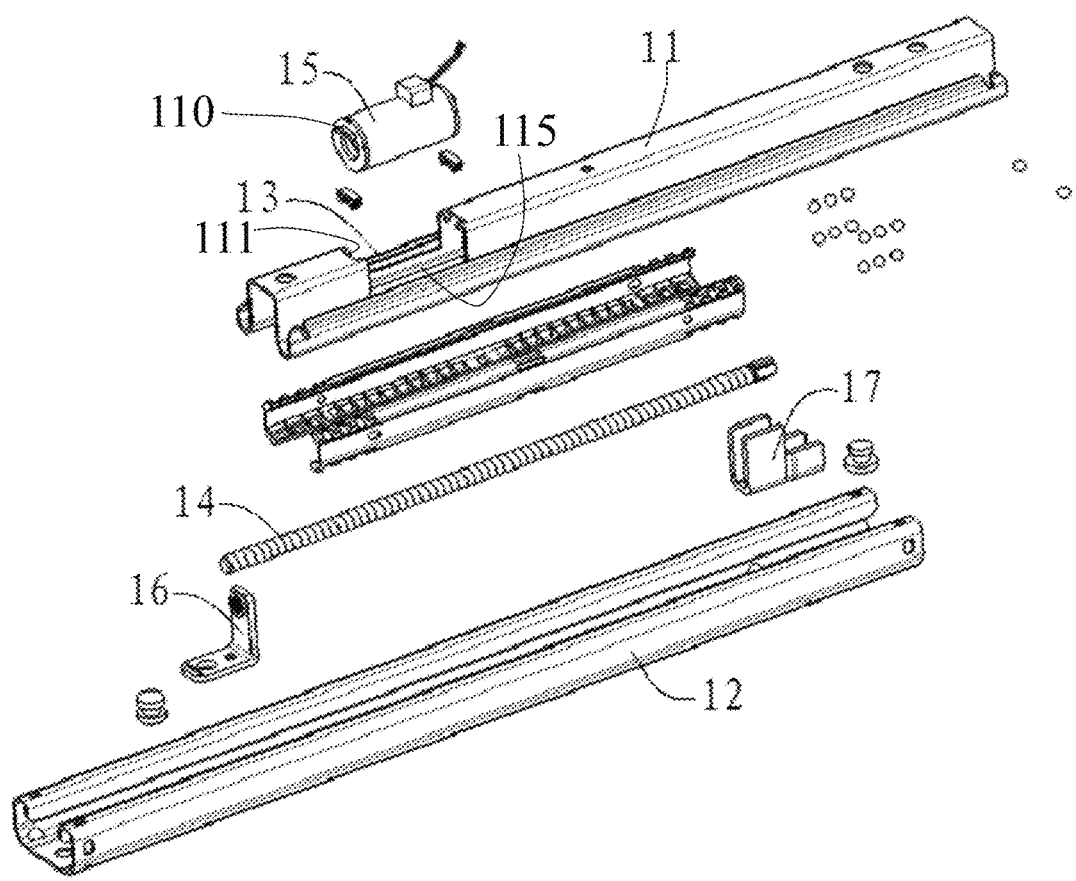
FIG. 4 is an exploded view of the power slide according to the invention.
Figure 5:
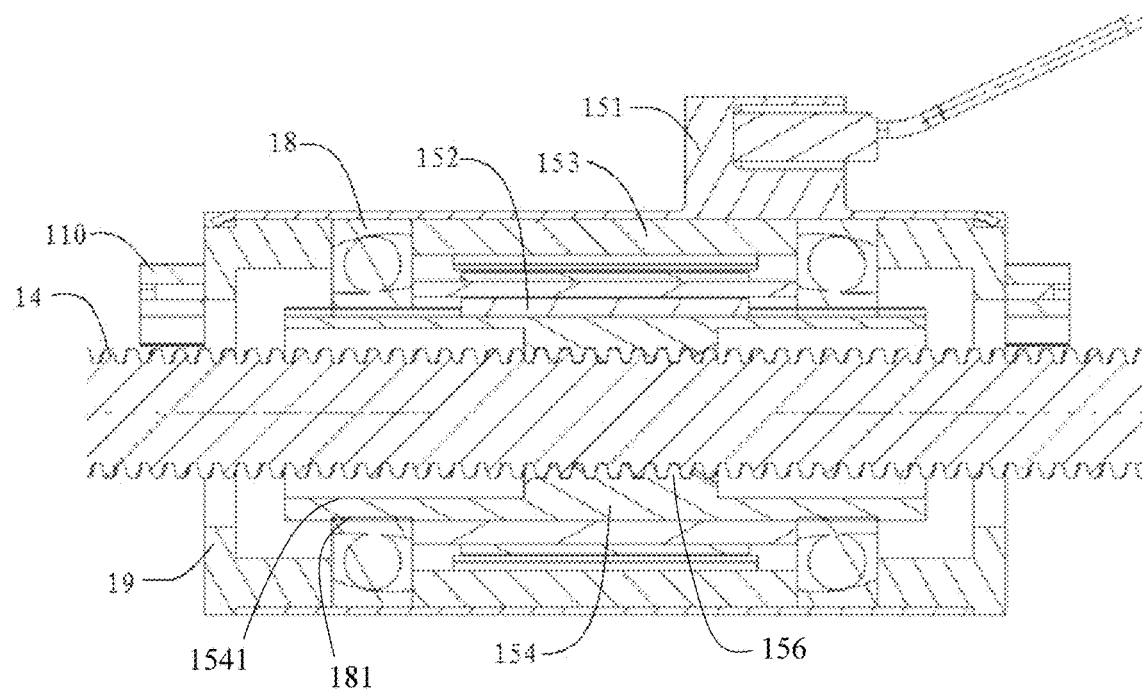
FIG. 5 is a sectional view of an electric motor of the power slide according to the invention.
Figure 6:
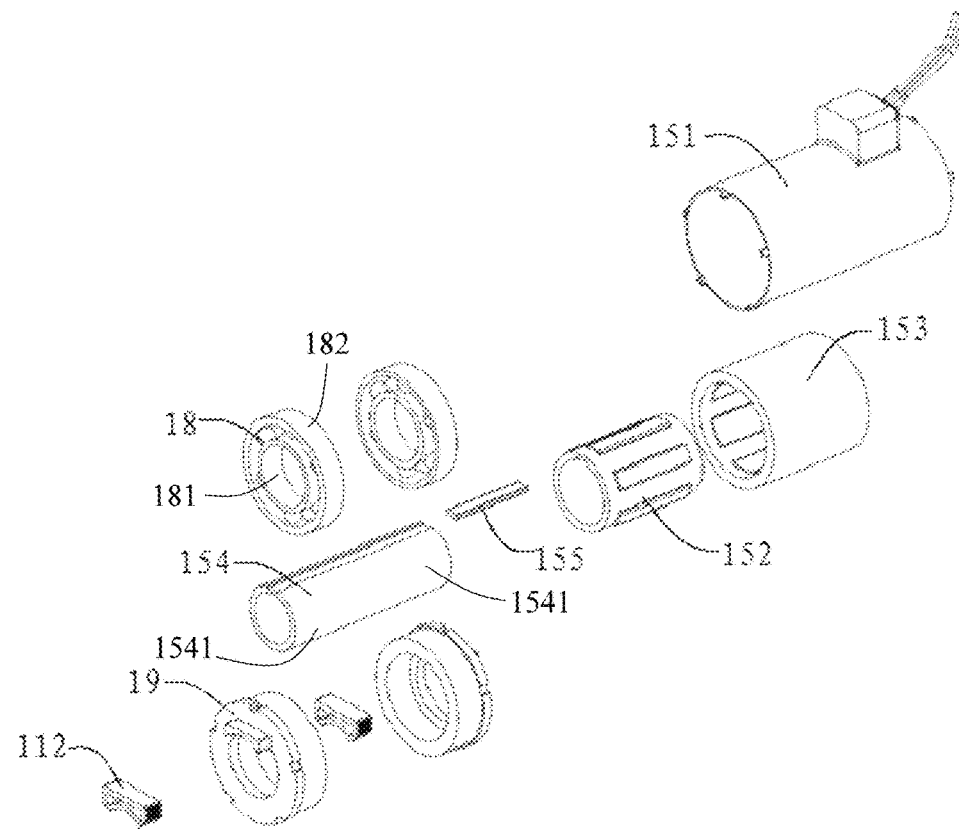
FIG. 6 is an exploded view of the electric motor of the power slide according to the invention.
Figure 7:
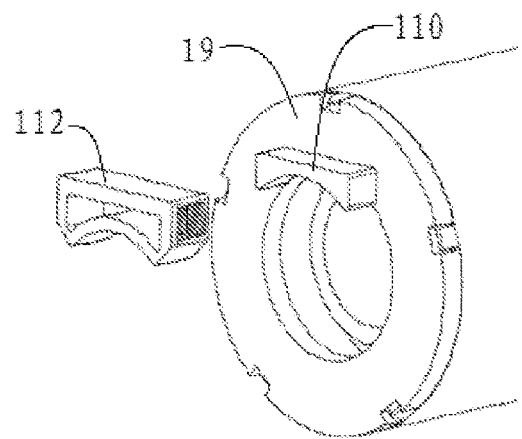
FIG. 7 is a structural diagram of an end cover of the power slide according to the invention.
Figure 8:
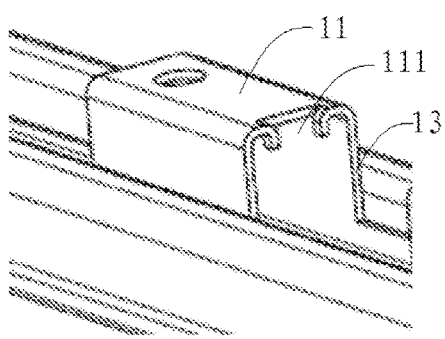
FIG. 8 is a partial view of a top rail of a power slide in Embodiment 1 of the invention.

Referring to FIGS. 3-8, the invention provides a power slide which comprises a left slide 1 and a right slide 2. The left slide 1 and the right slide 2 each comprise a top rail 11, a bottom rail 12, a lead screw 14, and an electric motor 15.

The top rail 11 is arranged above the bottom rail 12 and is slidably connected to the bottom rail 12, and a notch 13 is formed in the middle 115 of the top rail 11.

The lead screw 14 is arranged above the bottom rail 12 in parallel and has two ends fixedly connected to the bottom rail 12.

The electric motor 15 includes a housing 151, a rotor shaft and a stator shaft 153. The housing 151 is mounted in the notch 13, the stator shaft 153 is fixedly connected into the housing 151, and the rotor shaft penetrates into the stator shaft 153, is rotatably connected to the stator shaft 153 and is threadedly connected to the lead screw 14.

According to the invention, when the position of the power slide needs to be adjusted, the rotor shaft of the electric motor 15 is matched with the lead screw 14 in a threaded manner, the lead screw 14 is fixedly connected to the bottom rail 12, in this way, the rotational motion of the rotor shaft can be converted into the relative linear motion of the top rail 11 and the bottom rail 12, so that an adjustment of the relative positions of the top rail 11 and the bottom rail 12 is realized. Moreover, through the internal electric motor 15, parts such as a motor bracket and a flexible shaft are omitted, and the number of parts is reduced, so the power slide can adapt to more complicated electric car body environments and has increased universality and stability.

Embodiment 1

In the invention, the rotor shaft comprises a rotor shaft body 152 and an internal threaded shaft 154. An outer surface of the internal threaded shaft 154 is fixedly connected to the rotor shaft body 152, and the interior of the internal threaded shaft 154 is connected to the lead screw 14 in a threaded manner. In the invention, the rotor shaft body 152 and the internal threaded shaft 154 are fixedly connected by means of a key 155 or in an interference manner. In the invention, the rotor shaft 152 and the internal threaded shaft 154 may also be fixedly connected by welding or in other manners.

Preferably, the power slide of the invention further comprises a front bracket 16 and a rear bracket 17, wherein the front bracket 16 and the rear bracket 17 are fixed to the bottom rail 12 in a spaced manner, and two ends of the lead screw 14 are connected to the front bracket 16 and the rear bracket 17, respectively. Preferably, one end of the lead screw 14 is connected to the front bracket 16 in a threaded manner, and the other end of the lead screw 14 is fixedly connected to the rear bracket 17. In the invention, the front bracket 16 and the rear bracket 17 are fixed to the bottom rail 12 in a riveted manner, so that the connection strength of the front bracket 16 and the rear bracket 17 is guaranteed. The lead screw 14 is connected to the front bracket 16 in a threaded manner, so that tolerance requirements in the fabrication process can be compensated. The lead screw 14 is connected to the rear bracket 17 by welding, so that the connection strength is further guaranteed.

Preferably, the power slide of the invention further comprises bearings 18 and end covers 19, wherein inner rings 181 of the bearings 18 are disposed around two ends 1541 of the inner threaded shaft 154, and outer rings 182 of the bearings 18 are connected to the stator shaft through the end covers 19. In the invention, the bearings 18 are angular contact ball bearings and can withstand a radial force and guarantee stable relative rotation of the rotor shaft body 152 with respect to the stator shaft. The bearings 18 can also withstand an axial force, so that threaded engaging transmission between the internal threaded shaft 154 and the lead screw 14 can be converted into linear movement of the stator shaft and the shell 151.

In the invention, to prevent the housing 151 against rotation, clamping blocks 110 are arranged on outer end surfaces of the end covers 19, clamping grooves 111 are formed in the notch 13, and the clamping blocks 110 are matched with the clamping grooves 111.

Preferably, a first rubber part 112 is arranged between each of the clamping blocks 110 and a respective one of the clamping grooves 111, and the first rubbers 112 match the clamping blocks 110 in shape. The first rubber parts 112 can be disposed around the clamping blocks 110 to prevent the end covers 19 against direct contact with the top rail 11, so that noises can be avoided when the motor reverses or operates.

In the invention, the end covers 19 may be mounted in the notch 13 by means of connecting brackets, and the connecting brackets are welded and connected to the top rail 11. A second rubber part is arranged between each of the end covers 19 and a respective one of the connecting brackets.

According to invention, when the top rail 11 is subject to a front or back longitudinal force (parallel to the top rail 11) in a static state, the top rail 11 transmits the force to the end covers 19, and the end covers 19 transmit the longitudinal force to the internal threaded shaft 154 through the bearings 18. When the internal threaded shaft 154 and the lead screw 14 are subject to the longitudinal force, relative movement in the longitudinal direction can be avoided by means of the self-locking function of a thread pair and the anti-rotation function of the electric motor 15, so that the top rail 11 and the bottom rail 12 are locked relatively.

In the invention, a threaded part 156 is arranged in the rotor shaft and is engaged with the lead screw 14.

Embodiment 2

Figure 9:
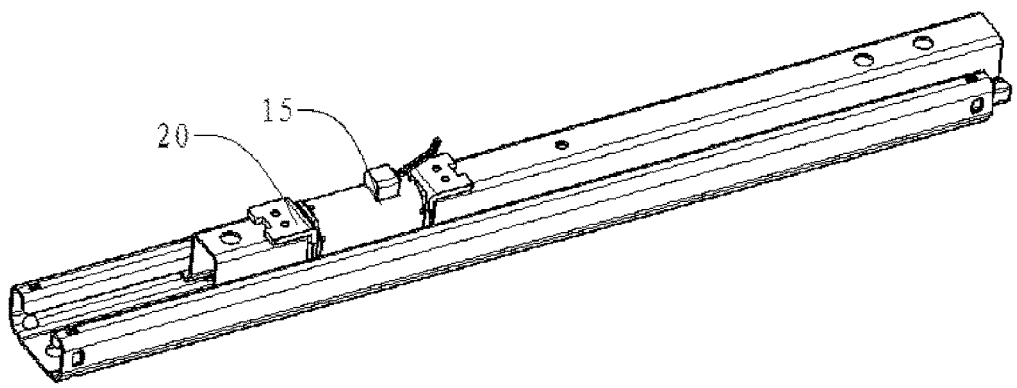
FIG. 9 is a structural diagram of a power slide in Embodiment 2 of the invention.
Figure 10:
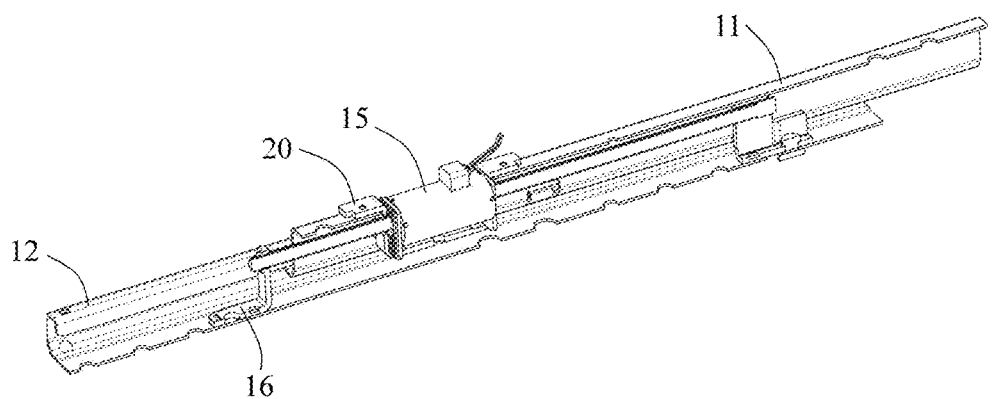
FIG. 10 is a sectional view of FIG. 9.
Figure 11:
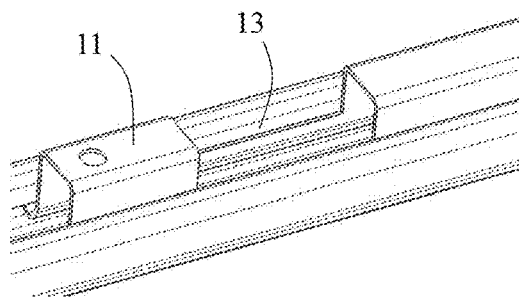
FIG. 11 is a partial view of a top rail of the power slide in Embodiment 2 of the invention.
Figure 12:
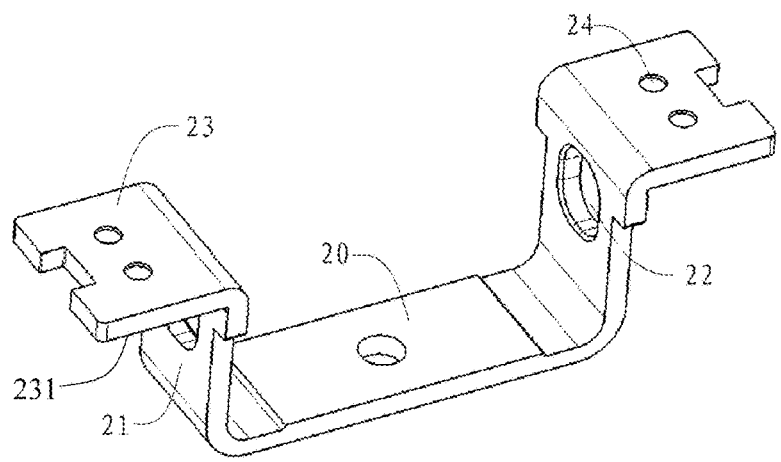
FIG. 12 is a structural diagram of a motor bracket of the Power Slide in Embodiment 2 of the invention.
Figure 13:
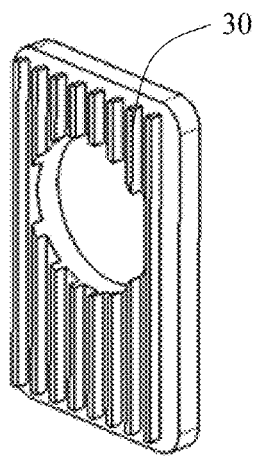
FIG. 13 is a structural diagram from a first perspective a third rubber part of the power slide in Embodiment 2 of the invention.
Figure 14:
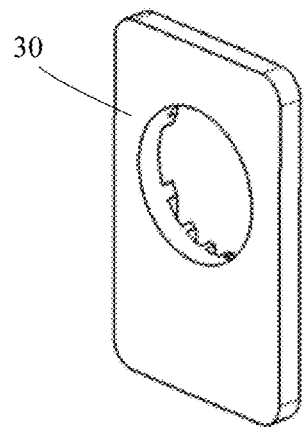
FIG. 14 is a structural diagram from a second perspective of the third rubber part of the power slide in Embodiment 2 of the invention.
Figure 15:
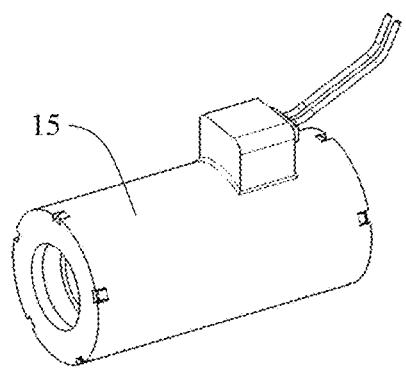
FIG. 15 is a structural diagram of an electric motor of the power slide in Embodiment 2 of the invention.

As shown in FIG. 9-FIG. 15, the power slide of the invention further comprises an electric motor bracket 20 having a U shape. Vertical portions 21 are respectively arranged on two sides of the motor bracket 20, and a hole 22 is formed in each of the vertical portions 21. Two end sections 23 respectively extending towards two sides are arranged at a top end of the U-shaped motor bracket 20, a weld point 24 is arranged on each of the end sections 23, and the end sections 23 are parallel to the top rail 11. Lower surfaces 231 of the end sections 23 are attached to a top surface of the top rail 11 and are welded and fixed to the top rail 11 by means of the weld points 24.

The electric motor 15 is mounted in a concave portion of the U-shaped motor bracket 20, and two third rubber parts 30 are mounted on two sides of the electric motor 15 to prevent direct contact between the electric motor 15 and the electric motor bracket 20, so that noises can be avoided when the electric motor 15 reverses or operates.

The above description is merely used to explain specific implementations of the invention, and is not intended to limit the protection scope of the invention. Any variations or substitutions that can be made without creative labor should also fall within the protection scope of the invention. Thus, the protection scope of the invention should be subject to the protection scope defined by the claims.

What is claimed is:

1. A power slide, comprising a left slide and a right slide, wherein the left slide and the right slide each comprise:
   a top rail and a bottom rail, wherein the top rail is arranged above the bottom rail and is slidably connected to the bottom rail, and a notch is formed in a middle portion of the top rail;
   a lead screw, wherein the lead screw is arranged above the bottom rail in parallel and has two ends fixedly connected to the bottom rail; and
   an electric motor, comprising a housing, a rotor shaft and a stator shaft, wherein the housing is mounted in the notch, the stator shaft is fixedly connected into the housing, the rotor shaft penetrates into the stator shaft and is rotatably connected to the stator shaft, and an interior of the rotor shaft is threadedly connected to the lead screw.

2. The power slide according to claim 1, wherein the rotor shaft comprises a rotor shaft body and an internal threaded shaft, an outer surface of the internal threaded shaft is fixedly connected to the rotor shaft body, and an interior of the internal threaded shaft is threadedly connected to the lead screw.

3. The power slide according to claim 2, wherein the rotor shaft body and the internal threaded shaft are fixedly connected by a key or in an interference manner.

4. The power slide according to claim 3, further comprising a front bracket and a rear bracket, wherein the front bracket and the rear bracket are fixed to the bottom rail in a spaced manner, and two ends of the lead screw are connected to the front bracket and the rear bracket, respectively.

5. The power slide according to claim 4, further comprising bearings and end covers, wherein inner rings of the bearings are respectively disposed around two ends of the internal threaded shaft, and outer rings of the bearings are respectively connected to the stator shaft through the end covers.

6. The power slide according to claim 5, wherein clamping blocks are respectively arranged on outer end surfaces of the end covers, clamping grooves are formed in the notch, and the clamping blocks are respectively matched with the clamping grooves.

7. The power slide according to claim 6, wherein a first rubber part is arranged between each of the clamping blocks and a respective one of the clamping grooves, and the first rubbers match the clamping blocks in shape.

8. The power slide according to claim 1, further comprising an electric motor bracket having a U shape, wherein two vertical portions are respectively arranged on two sides of the motor bracket, a hole is formed in each of the vertical portions, two end sections respectively extending towards two ends of the top rail are arranged at a top end of the motor bracket, the two end sections are parallel to the top rail, lower surfaces of the end sections are welded and fixed to a top surface of the top rail, and the electric motor is mounted in a concave portion of the U-shaped motor bracket.

9. The power slide according to claim 8, wherein rubber parts are respectively arranged between the electric motor and the two sides of the electric motor bracket.

10. The power slide according to claim 1, wherein a threaded part is arranged in the rotor shaft and is engaged with the lead screw.

11. The power slide according to claim 2, further comprising bearings and end covers, wherein inner rings of the bearings are respectively disposed around two ends of the internal threaded shaft, and outer rings of the bearings are respectively connected to the stator shaft through the end covers.

12. The power slide according to claim 3, further comprising bearings and end covers, wherein inner rings of the bearings are respectively disposed around two ends of the internal threaded shaft, and outer rings of the bearings are respectively connected to the stator shaft through the end covers.

* * * * *